United States Patent [19]
Tsukahara

[11] Patent Number: 6,016,407
[45] Date of Patent: Jan. 18, 2000

[54] ENERGY SAVING ELECTRONIC DEVICE

[75] Inventor: Daiki Tsukahara, Tokyo, Japan

[73] Assignee: Nikon Corporation, Tokyo, Japan

[21] Appl. No.: 09/102,907

[22] Filed: Jun. 23, 1998

[30] Foreign Application Priority Data

Jul. 17, 1997 [JP] Japan ..................................... 9-192501

[51] Int. Cl.$^7$ ................................................. G03B 7/26
[52] U.S. Cl. .......................................... 396/302; 396/301
[58] Field of Search ...................................... 396/301, 302

[56] References Cited

U.S. PATENT DOCUMENTS

| | | | |
|---|---|---|---|
| 4,387,977 | 6/1983 | Uchidoi et al. | 396/302 |
| 4,429,975 | 2/1984 | Shiozawa et al. | 396/303 |
| 4,636,056 | 1/1987 | Kobayashi et al. | 396/302 |
| 4,933,704 | 6/1990 | Takami et al. | 396/301 |
| 5,162,839 | 11/1992 | Wakabayashi et al. | 396/302 |
| 5,309,195 | 5/1994 | Goo et al. | 396/302 |
| 5,389,998 | 2/1995 | Dunsmore et al. | 396/301 |
| 5,396,443 | 3/1995 | Mese et al. . | |
| 5,655,163 | 8/1997 | Tsukahara et al. . | |

FOREIGN PATENT DOCUMENTS

6-119090  4/1994  Japan .

*Primary Examiner*—Russell Adams
*Attorney, Agent, or Firm*—Oliff & Berridge, PLC

[57] ABSTRACT

An electronic device has a plurality of prestored limit times that define a time period of non-use, after which the electronic device will enter an energy-saving state. A different one of the plurality of limit times can be selected for different operating modes of the electronic device. Thus, when the electronic device is switched between different modes, different limit times, which define the duration of the non-use period prior to entering the energy-saving state, will take effect. Additionally or alternatively, a different one of the plurality of limit times can be selected for different geographical conditions. Thus, when the electronic device is being used in a first geographical condition, for example, a place where batteries are readily available and inexpensive, the limit time is increased in order to improve the operability of the electronic device. Conversely, when the electronic device is used in a geographical condition where batteries are expensive and/or difficult to find, the limit time is decreased so as to conserve battery power. According to one embodiment, the invention is applied to an electronic camera to set different limit times for shutting off an LCD of the camera.

35 Claims, 10 Drawing Sheets

ENERGY SAVING ELECTRONIC DEVICE

INCORPORATION BY REFERENCE

The disclosure of the following priority application is herein incorporated by reference: Japanese Patent Application No. 9-192501, filed Jul. 17, 1997.

BACKGROUND OF THE INVENTION

1. Field of Invention

The present invention relates to electronic devices having various components that consume energy. For example, the invention is applicable to a camera having a display that displays image data or display data (character information or the like), and in particular to a camera that changes a light-deactivation time of the display in response to a change of the setting of an operation mode or the like of the camera.

2. Description of Related Art

Electronic cameras are known that photoelectrically convert an object image by using an imaging element (e.g., a CCD). These cameras record the photoelectrically converted image data on a recording medium (memory).

Many of these electronic cameras include a liquid crystal display (LCD) panel. These LCDs are used to display an object image rather than using a viewfinder. They also are used to replay image data saved on the recording medium, or the like. A back light is provided behind such LCDs. As is known, the back light typically is a white light source.

In general, the back light consumes a large amount of power so that the usage time of the camera batteries is significantly shortened. Therefore, when a non-operation state of the device continues, it is known to activate a power-saving state in which the back light is turned off. See Japanese Laid-Open Patent Publication No. 6-119090 and its corresponding U.S. Pat. No. 5,396,443.

In general, the frequency at which an operator externally operates a camera significantly varies depending upon various usage situations and scenes. Furthermore, there exist both situations that frequently require a display of the LCD by the operator and situations that do not require much display of the LCD.

However, in the conventional camera, the time (hereafter referred to as the "display limit time") at which the power-saving state is activated by turning off the back light is uniformly set.

Because of this, sometimes, when an operator tries to perform a next operation after a certain time period, there is a problem in that the back light has been turned off. Accordingly, the operation can not be smoothly (quickly) continued. At other times, even if an operator does not need a display of the LCD, there is a problem in that the back light is on uselessly, which wastes power.

Meanwhile, depending upon geographical conditions or the like of the operator, the cost of batteries and the convenience of access to batteries significantly varies. Thus, in certain geographical conditions, even though the operation of a camera is sacrificed to a certain degree, there is a desire on the part of the operator to ensure a long usage time of the battery. Conversely, in other geographical conditions, even if the usage time of the battery is somewhat shortened, there is a desire on the part of the operator to place a priority on the optimal operation of the camera.

SUMMARY OF THE INVENTION

Aspects of the invention relate to electronic devices having a limit time that defines a time period of non-use, after which the electronic device will enter an energy-saving state. According to one aspect of the invention, different limit times are set for different operating modes of the electronic device. Thus, when the electronic device is switched between different modes, different limit times, which define the duration of the non-use period prior to entering the energy-saving state, will take effect.

According to another aspect of the invention, different limit times are set for different geographical conditions. Thus, when the electronic device is being used in a first geographical condition, for example, a place where batteries are readily available and inexpensive, the limit time is increased in order to improve the operability of the electronic device. Conversely, when the electronic device is used in a geographical condition where batteries are expensive and/or difficult to find, the limit time is decreased so as to conserve battery power. The limit time can be changed by actuating a switch or by providing a location-determining system (e.g., GPS) for the electronic device.

The invention is applicable to any device that uses energy, in order to conserve energy. However, the invention, when used with battery-operated devices, provides the further advantage of reducing the inconvenient situation that occurs when the battery power is used-up, while improving the operability of the electronic device.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Preferred embodiments of the invention will be described in detail hereafter. These preferred embodiments relate to cameras having LCDs, and the invention is applied in order to vary the non-use time (the limit time) required before the camera enters an energy (and battery) conserving mode by which power is conserved by turning off a back light of the LCD. The invention is applicable to electronic devices other than cameras, and is applicable to controlling electronic device components other than LCD back lights in order to conserve energy.

For example, electronic devices to which the invention can be applied include PCs, word processors, personal assistants, electronic calculators, electronic notebooks, etc. The invention is applicable to non-portable devices that run off electric utility power sources and to portable devices that utilize battery power. The invention provides additional advantages with portable devices because it reduces the inconvenience that results when batteries fail, while improving the operability of the device.

Some examples of electronic device components that can be controlled to conserve power include, for example, motors, disk drives, displays, sensors, controllers (e.g., microprocessors), etc. Power is conserved by reducing the power consumption of such components. Reducing the power consumption can include switching off the power, or simply lowering the amount of power (e.g., by lowering the voltage or the duty cycle) provided to that component.

Figure 1:
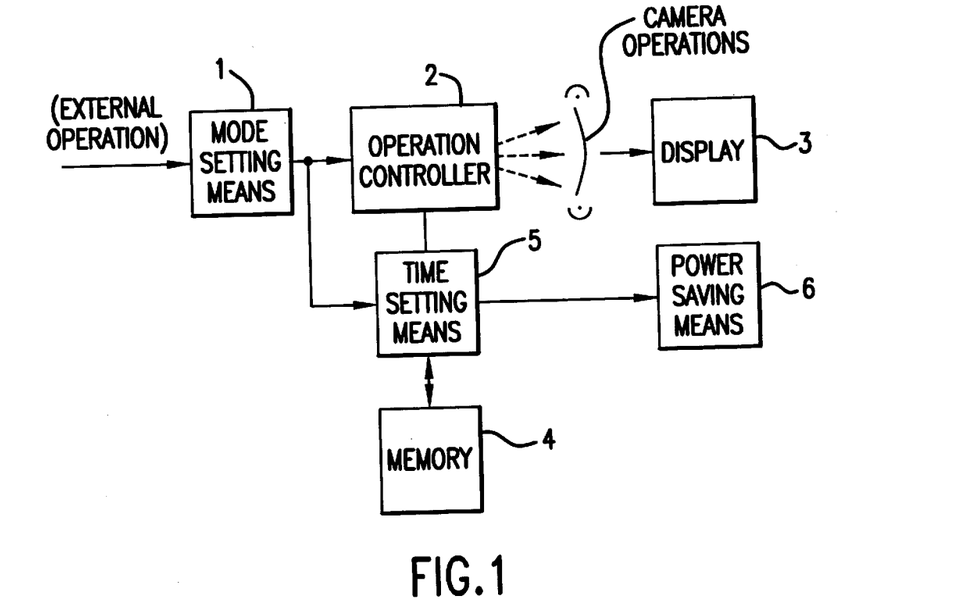
FIG. 1 is a high-level functional diagram of a first aspect of the invention.

FIG. 1 is a high-level representation of one aspect of the invention applied to an electronic camera. An electronic camera includes a number of functional portions or subsections, referred to in FIG. 1 as "means." As will become clear from the ensuing description, each means is not necessarily a separate or separable unit or component of the camera. There can be overlap between the actual structure and software of the camera that performs (or corresponds to) the various means. For example, a single microprocessor can function as parts of (or all of) more than one of the illustrated means. Alternatively, it is possible to use separate, dedicated microprocessors for each means that relies on microprocessor control.

A camera with a display function has a shooting mode in which it performs shooting (photographing) of the object, and at least one operation mode other than the shooting mode. Thus, the camera includes mode setting means 1 that switches between the plurality of the operation modes in response to an external operation, e.g., manual actuation of a switch. Of course, other forms of actuation, such as, e.g., by remote control are possible. An operation controller 2 controls an operation of a camera in response to an operation mode set through the mode setting means 1. Display 3 displays image data or display data, which is formed in response to the operation of the camera, on a screen. The camera further comprises memory 4 to store a corresponding relationship between an operation mode and a display limit time created in advance. This is done by assigning a particular display limit time to each of the plurality of operation modes. Time setting means 5 obtains the display limit time assigned to the currently selected operation mode, based upon the corresponding relationship stored in the memory 4. Power-saving means 6 decreases or turns off the display brightness of the display 3 when the display time of the display 3, during a non-operation state (an uninterrupted period of time during which the camera is not manipulated), exceeds the display limit time obtained by the time setting means 5.

According to one example, the plurality of operation modes includes a shooting mode that performs shooting and recording of the object image, and a replay mode that replays image data previously recorded in internal memory of the camera. Typically, the display limit time in the replay mode is longer than the display limit time in the shooting mode.

According to another example, the plurality of operation modes includes at least a shooting mode that images and records the object image and a communication mode that transfers image data previously imaged and/or recorded in the shooting mode to an external source. Typically, the display limit time in the communication mode is shorter than the display limit time in the shooting mode.

Figure 2:
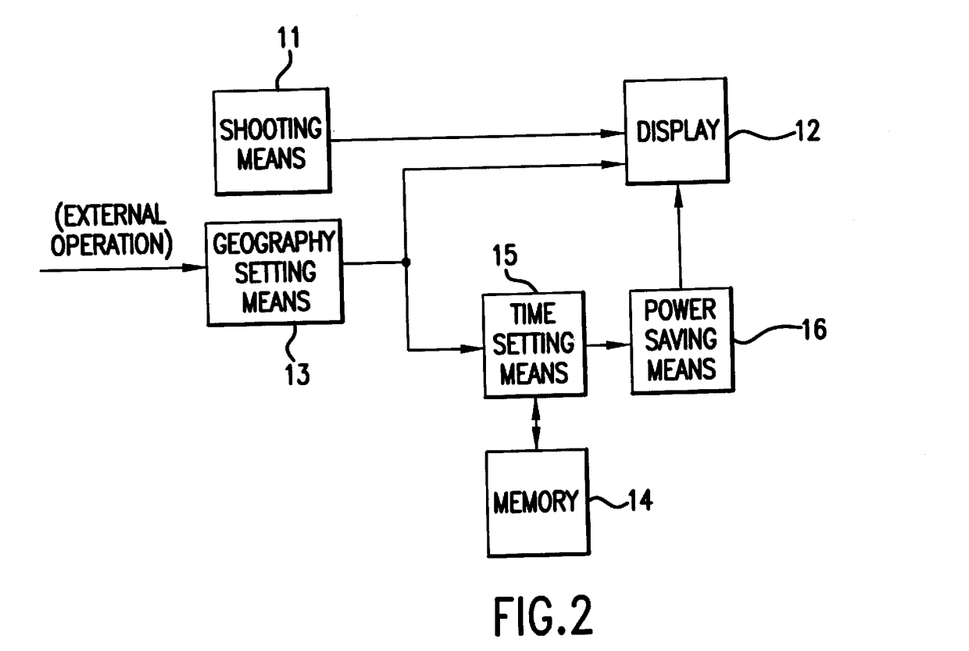
FIG. 2 is a high-level functional diagram of a second aspect of the invention.

FIG. 2 is a high-level representation of a second aspect of the invention applied to an electronic camera. The camera with a display function has a shooting means 11 that performs shooting (photographing) of an object. A display 12 displays on a screen, image data or other data supplied from the shooting means 11. A geography setting means 13 switches the usage geography in response to an external operation. The external operation could be, for example, actuation of a switch. The switch could designate between different countries or languages. The switch could designate between different geographical conditions (e.g., isolated vs. populated, camping vs. city, etc.). Alternatively, the external operation could be a signal supplied from a sensor that senses information that changes based on changing geographical conditions. For example, the sensor could be part of a Global Positioning System (GPS), programmed to distinguish between remote and populated areas (in which batteries are either difficult or easy to obtain). Other information that varies based on geography includes temperature and altitude.

The camera also includes a memory 14 that stores the corresponding relationship between the usage geography and the display limit time created in advance. A time setting means 15 attains the display limit time to be assigned to the current usage geography. A power saving means 16 decreases or turns off the display brightness of the display 12 when the display time of the display 12, during a non-operation state, exceeds the display limit time obtained from the time setting means 15.

Specific embodiments of the present invention are now described.

Figure 3:
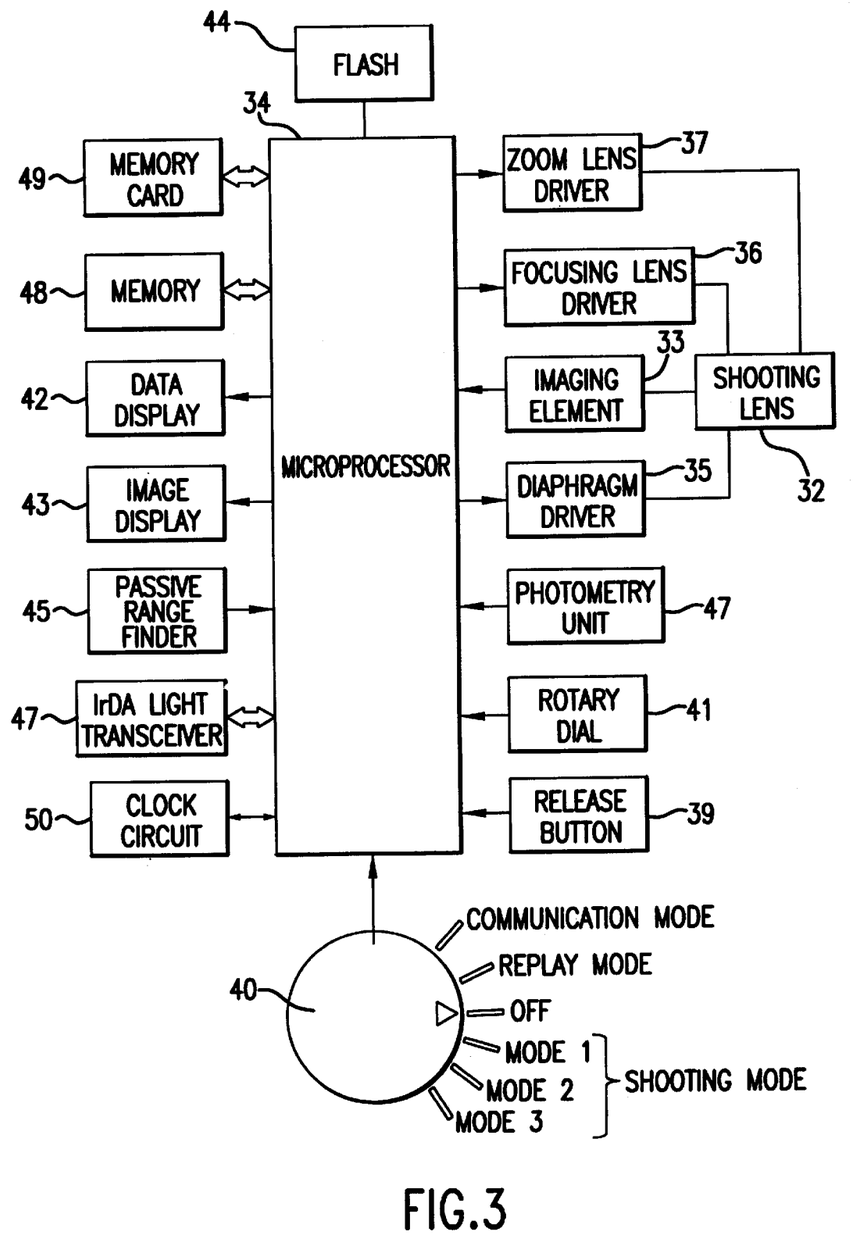
FIG. 3 is a schematic block diagram of a first embodiment of the invention.
Figure 4:
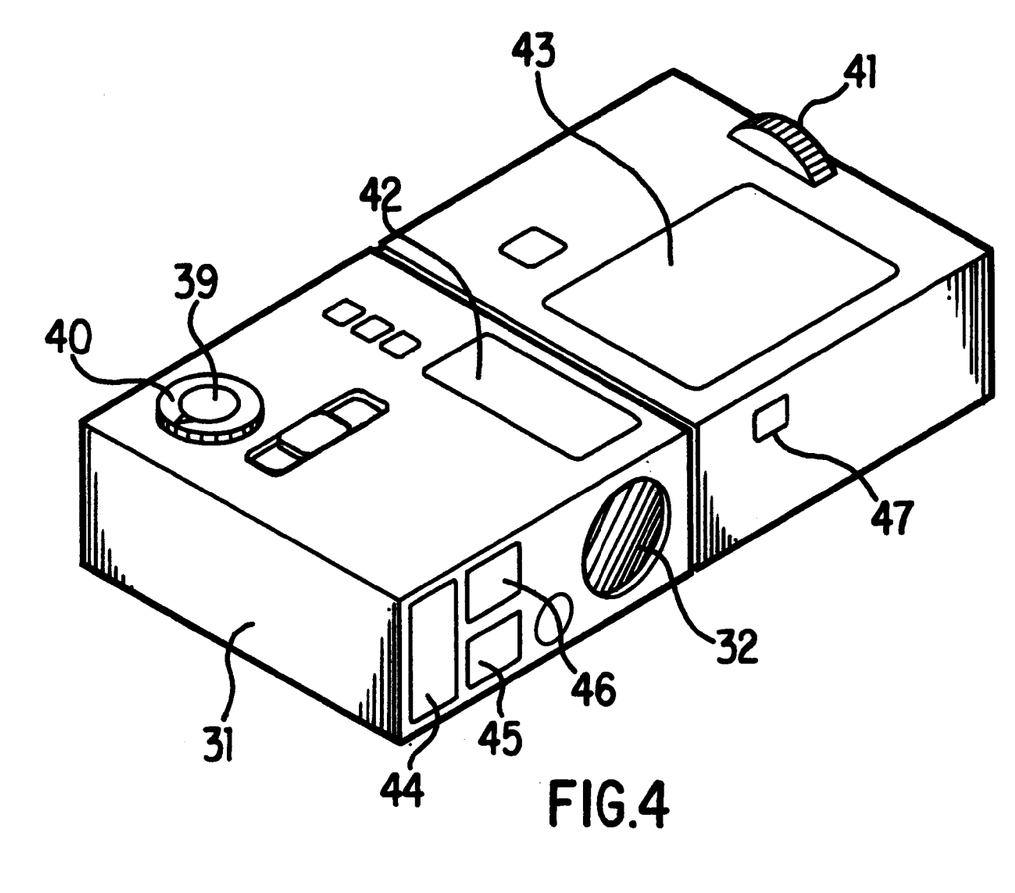
FIG. 4 is a perspective view of a camera incorporating the present invention.

FIG. 3 is a schematic block diagram of a first embodiment, which incorporates the first aspect of the invention. FIG. 4 is a perspective view of the camera. As shown in FIGS. 3 and 4, a shooting lens 32 is arranged at the front of the electronic camera 31. An imaging element 33 (e.g., a CCD) is arranged on the optical axis of the shooting lens 32. An image output terminal of the shooting element 33 is connected to a microprocessor 34 through an image processing circuit (undepicted) that performs $\gamma$ correction, AD conversion, and/or the like.

A diaphragm driver 35, a focusing lens driver 36, and a zoom lens driver 37 are connected to control terminals of the microprocessor 34. These drivers 35 through 37 drive the respective lens groups and/or elements inside the shooting lens 32.

In addition, on the top surface of the electronic camera 31, a release button 39, a selection dial 40, and a rotary dial 41 are disposed. The output terminals of these operation members 39 through 41 are respectively connected to the microprocessor 34. The rotary dial 41 is a publicly-known "combined operation component." A two-phase encoder pulse is generated by a forward and reverse rotation, and a contact-point pulse is generated by a pressing operation toward the rotation center of the dial.

Also on the top surface of the electronic camera 31, a data display 42, which displays a frame number, exposure information, or the like, and an image display 43, which displays the image, are disposed. The control input terminals of the displays 42 and 43 are respectively connected to the microprocessor 34.

In addition, a flash 44, a passive range finder 45, a viewfinder 46, and an IrDA light transceiver 47 are each arranged on the front surface of the electronic camera 31. The flash 44, the passive range finder 45, and the IrDA light transceiver 47 are respectively connected to the microprocessor 34.

In addition, a non-volatile memory 48 that records the setting information or the like, a memory card 49 that records the image information, and a clock circuit 50 that performs the measurement of the (continuous) display time are connected to the microprocessor 34. The camera also includes a photometry unit 47 coupled to the microprocessor 34.

The following explains the operation of the electronic camera 31 for each operation mode.

Figure 5:
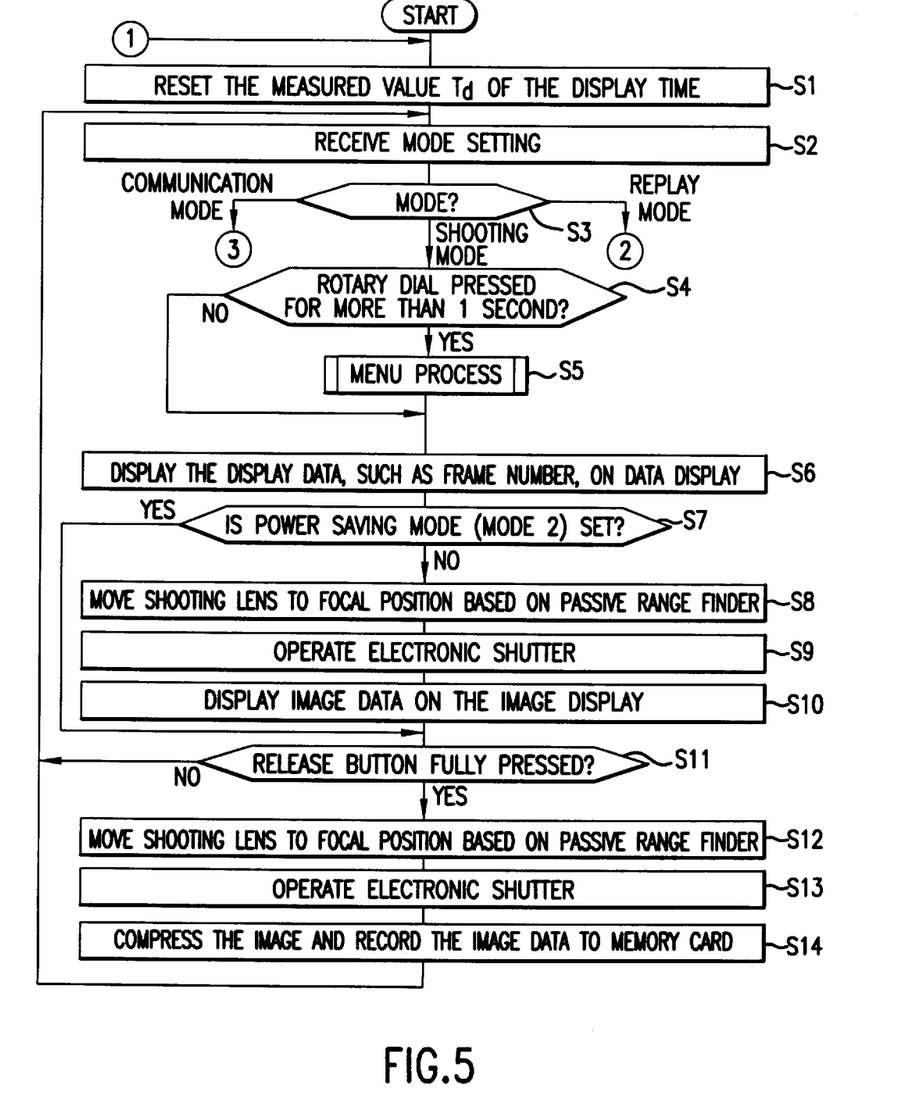
FIG. 5 is a flow chart explaining the operation of a shooting mode.

FIG. 5 is a flow chart explaining the operation of the shooting mode. First, when the main power is supplied to the electronic camera 31 by operating the selection dial 40, the microprocessor 34 begins the operation from step S1. That is, the microprocessor 34 resets the measured value Td of the display time in the clock circuit 50 (step S1). Td is a counter that indicates the amount of time the camera has been in the non-operation state. Whenever buttons, switches, etc., of the camera are manipulated, Td is reset (to zero).

Next, the microprocessor 34 takes in the setting of the operation mode from the selection dial 40 (step S2). The following five operation modes are available:

(1) MODE 1 . . . One of the shooting modes. "A combination of the shooting conditions" stored in advance is used as-is.

(2) MODE 2 . . . One of the shooting modes. For power saving, the back light of the image display 43 is always turned off. For framing during the shooting, the optical-type viewfinder 46 is used exclusively.

(3) Mode 3 . . . One of the shooting modes. The shooting conditions which were manually set are used.

(4) Replay mode . . . A mode that reads out the image data recorded in the memory card 49 and displays it on the image display 43.

(5) Communication mode . . . A mode that transfers image data to an external machine by using the IrDA light transceiver 47.

When an operation mode is set other than a shooting mode, the microprocessor 34 moves the operation to the respective controlling steps (step S3). That is, when the replay mode is set, the microprocessor 34 moves the operation to step S21 shown in FIG. 8. Furthermore, when the communication mode is set, the microprocessor 34 moves the operation to step S31 shown in FIG. 9.

Meanwhile, when the shooting mode is set, the microprocessor 34 determines whether the rotary dial 41 is pressed for more than one second (step S4). When the rotary dial 41 is pressed for more than one second, the microprocessor 34 performs a menu process to perform manual settings such as the shooting conditions as follows (step S5).

Figure 6:
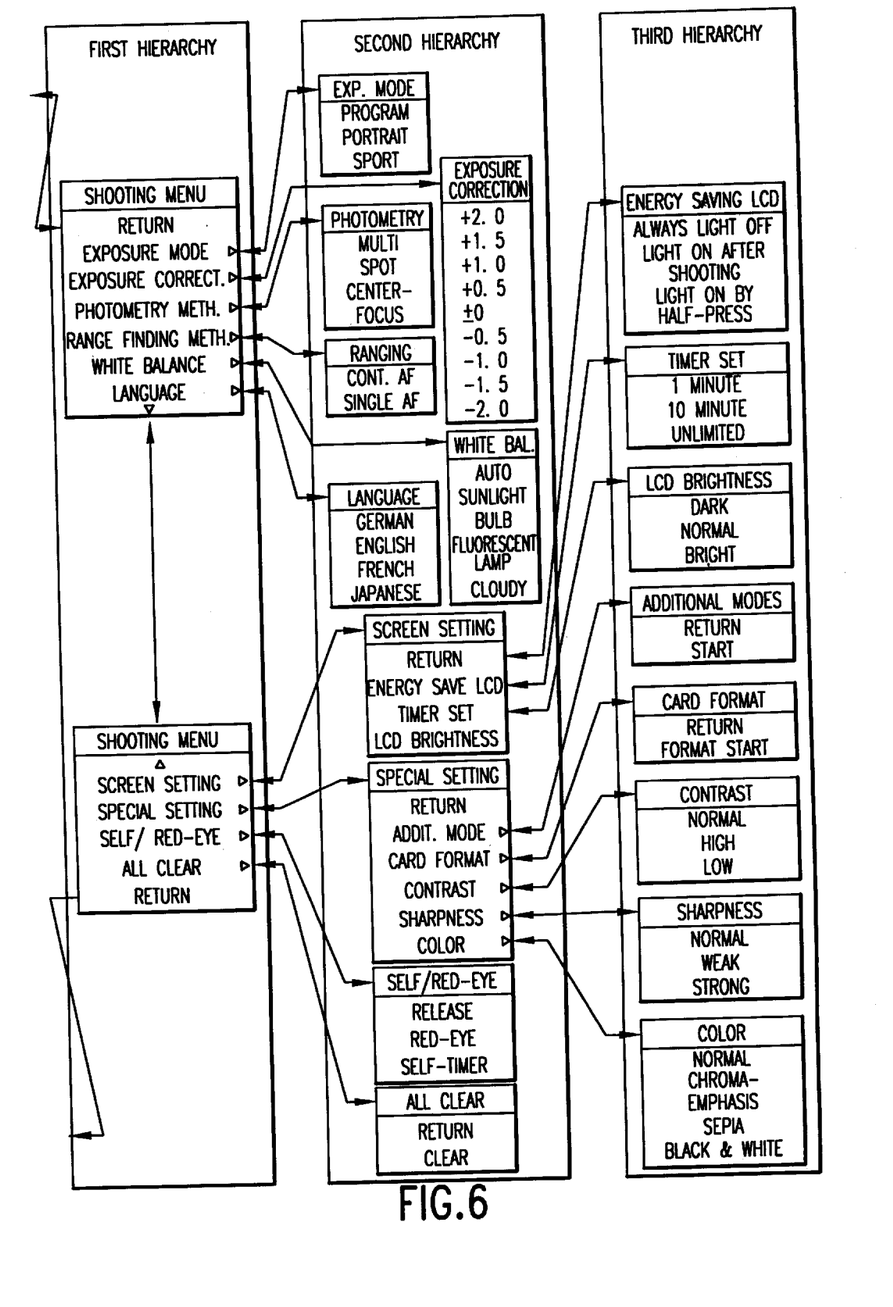
FIG. 6 is an explanatory drawing showing menu items.

First, the microprocessor 34 displays the first hierarchy menu shown in FIG. 6 on the image display 43. In this state, the operator rotates the rotary dial 41 to change the selection of the menu item, and selects the menu item by pressing the rotary dial 41.

Figure 7A:
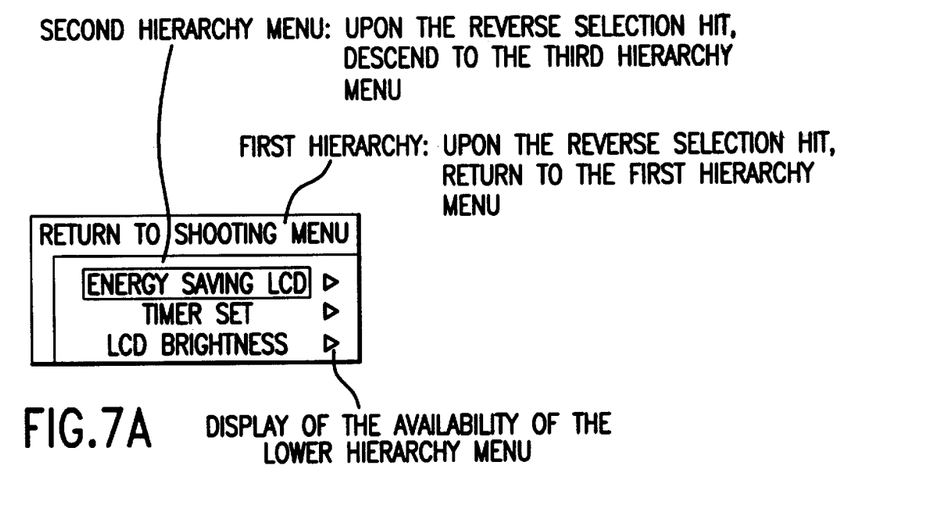
FIGS. 7a and 7b show display examples of the menu process.
Figure 7B:
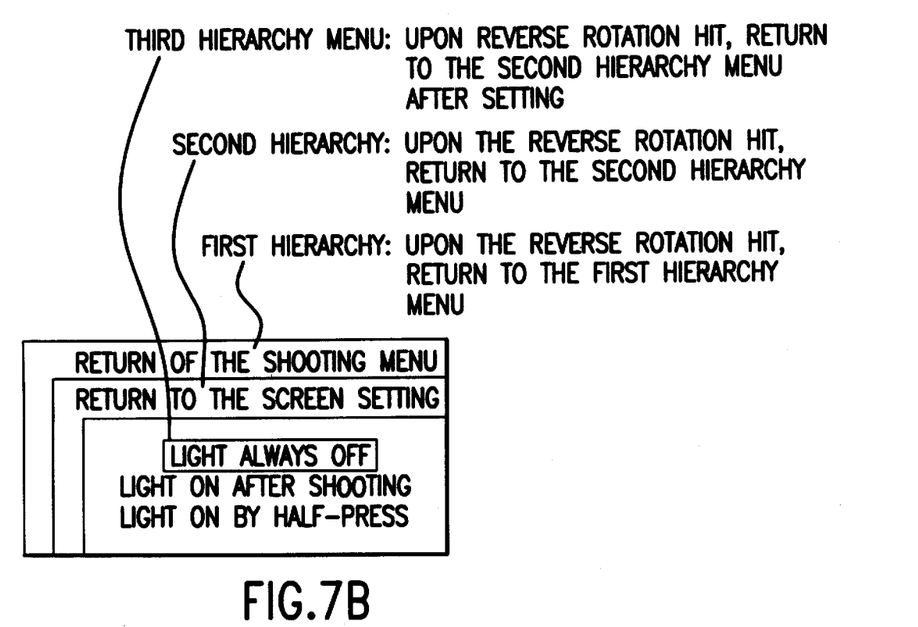

Following this menu selection operation, the microprocessor 34 sequentially displays the lower hierarchy menus shown in FIGS. 6, 7A and 7B on the image display 43. The microprocessor 34 takes in the result of the hierarchy menu selection and records it to the setting information in the memory 48. As illustrated in FIG. 7A, the main screen identifies a plurality (three) of second hierarchy menu items. An arrow displayed to the right of a second hierarchy item signifies that a plurality of possible settings (third hierarchy items) exist for that second hierarchy item. For example, FIG. 7B identifies a plurality of third hierarchy items (settings) that are available for the second hierarchy item "energy saving LCD." The upper part of the screen indicates the higher order hierarchy menus that are available. For example, a first hierarchy menu (the shooting menu) is available to be selected from both screens of FIGS. 7A and 7B, whereas the second hierarchy menu (the screen setting menu) also is available to be selected from the FIG. 7B screen.

Next, the microprocessor 34 displays the display data, such as a frame number, on the data display 42 (step S6).

Here, when the electronic camera 31 is set to the power saving mode (MODE 2 described above) (YES of step S7), the microprocessor 34 omits the processes involving the display 43, which will be described later, and moves the operation to step S11.

Meanwhile, when the electronic camera 31 is set to a mode other than the power saving mode (MODES 1 and 3 described above) (NO of step S7), the microprocessor 34 focuses the shooting lens 32, based upon the ranging value of the passive range finder 45 (step S8).

In this state, the microprocessor 34 takes in the display image by electronic shutter-operating the imaging element 33 (step S9) in order to carry out the display. The microprocessor 34 then displays the display image on the image display 43 (step S10).

After such processing, the microprocessor 34 determines whether the release button 39 is entirely pressed (step S11). When the release button 39 is not entirely pressed (NO of step S11), the microprocessor 34 omits the shooting operation, which will be described later, and returns the operation to step S2. When the release button 39 is entirely pressed (YES of step S11), the microprocessor 34 proceeds with the shooting operation as follows.

First, the microprocessor 34 moves the shooting lens 32 to a focusing state, based upon the ranging value of the passive range finder 45 (step S12). Next, the microprocessor 34 electronic shutter-operates the imaging element 33 and takes in the image data (step S13). After the image data that was taken in is image-compressed, the microprocessor 34 records this data to the memory card 49 (step S14).

After such a shooting operation is completed, the microprocessor 34 returns the operation to step S2. By the series of controlling steps explained above, the operation of the shooting mode is executed. Next, the operation of the replay mode will be explained.

Figure 8:
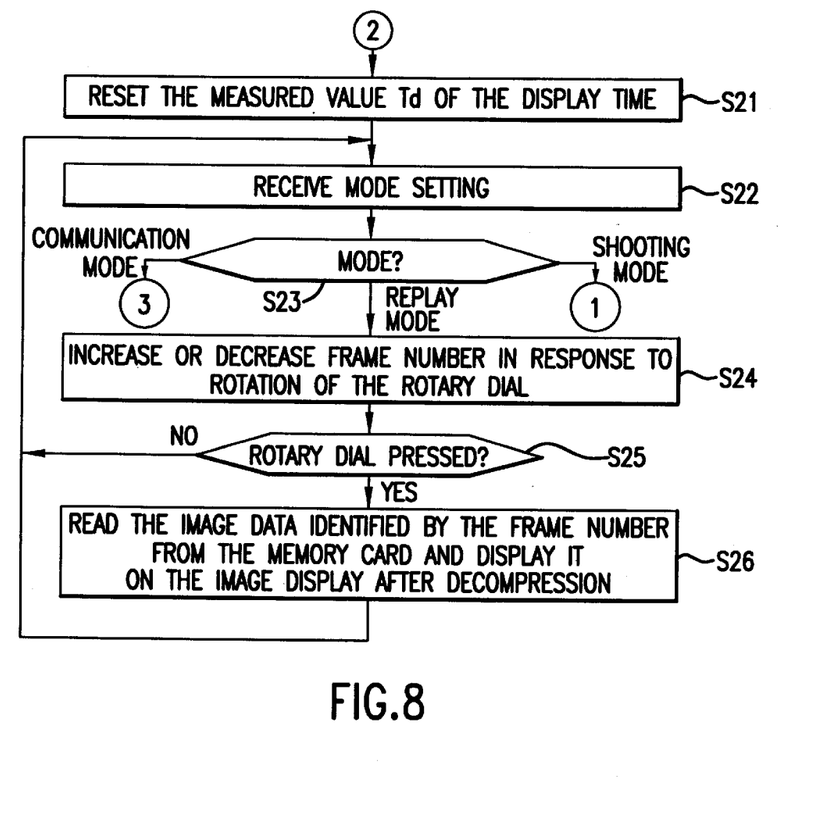
FIG. 8 is a flow chart explaining operation of the camera replay mode.

FIG. 8 is a flow chart explaining the operation of the replay mode. First, the microprocessor 34 resets the measured value Td of the display time in the clock circuit 50 (step S21). Next, the microprocessor 34 takes in the setting of the operating mode from the selection dial 40 (step S22). When the operating mode is set to a mode other than the replay mode, the microprocessor 34 moves the operation to the corresponding controlling steps (step S23). That is, when the shooting mode is set, the microprocessor 34 moves the operation to step S1 shown in FIG. 5. When the communication mode is set, the microprocessor 34 moves the operation to step S31 shown in FIG. 9.

Meanwhile, when the replay mode is set, the microprocessor 34 decreases or increases the value of the frame number displayed on the data display 42 in response to the rotating operation of the rotary dial 41 (step S24).

Next, the microprocessor 34 determines whether the rotary dial 41 is pressed (step S25). When the rotary dial 41 is not pressed (NO of step S25), the microprocessor 34 returns the operation to step S22 by omitting the replay operation, which will be described later. When the rotary dial 41 is pressed (YES of step S25), the microprocessor 34 reads the image data indicated by the current frame number from the memory card 49 and replay-displays it on the image display 43 after the image is decompressed (step S26). After such a replay operation, the microprocessor 34 returns the operation to step S22.

Figure 9:
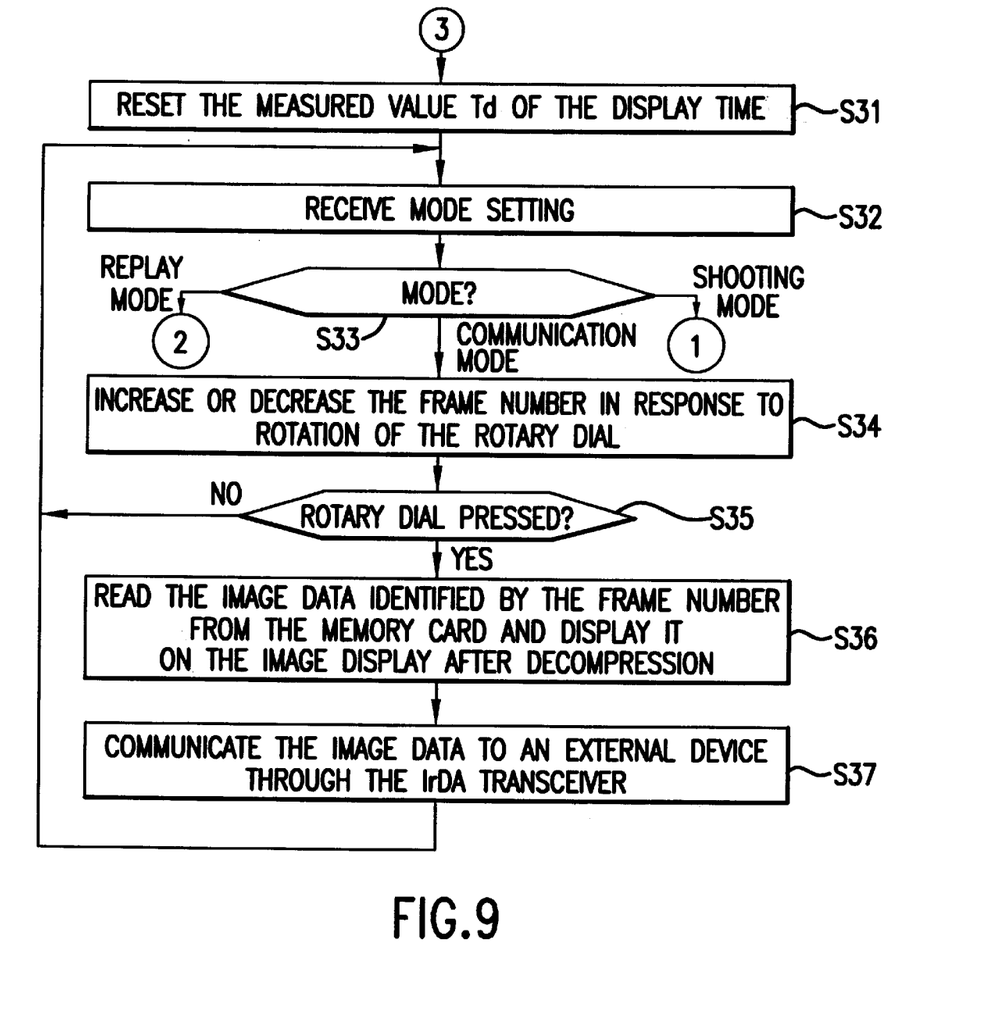
FIG. 9 if a flow chart explaining operation of the camera communication mode.

By the series of the controlling steps described above, the operation of the replay mode is executed. Next, the operation of the communication mode is explained. FIG. 9 is a flow chart explaining the operation of the communication mode. First, the microprocessor 34 resets the measured value Td of the display time in the clock circuit 50 (step S31). Next, the microprocessor 34 takes in the setting of the operation mode from the selection dial 40 (step S32).

Here, when an operation mode is set other than the communication mode, the microprocessor 34 moves the operation to the corresponding controlling steps (step S33). That is, when the shooting mode is set, the microprocessor 34 moves the operation to step S1 shown in FIG. 5. When the replay mode is set, the microprocessor 34 moves the operation to step 21 shown in FIG. 8.

Meanwhile, when the communication mode is set, the microprocessor 34 increases or decreases the value of the frame number displayed on the data display 42 in response to the rotating operation of the rotary dial 41 (step S34).

Next, the microprocessor 34 determines whether the rotary dial 41 is pressed. When the rotary dial 41 is not pressed (NO of step S35), the microprocessor 34 returns the operation to step S32 by omitting the communication operation, which will be described later. When the rotary dial 41 is pressed (YES of step S35), the microprocessor 34 reads the image data indicated by the current frame number from the memory card 49 and replay-displays it to the image display 43 after the image is decompressed (step S36).

In this state, the microprocessor 34 transfers and outputs the image data read from the memory card 49 to an external machine through the IrDA light transceiver 47 (step S37). Alternatively, communication can be perfonmed by a hardwire connection. Furthermore, a plurality of images can be simultaneously selected and transmitted.

After the completion of this communication operation, the microprocessor 34 returns the operation to step S32. By the series of controlling steps explained above, the operation of the communication mode is executed.

Figure 10:
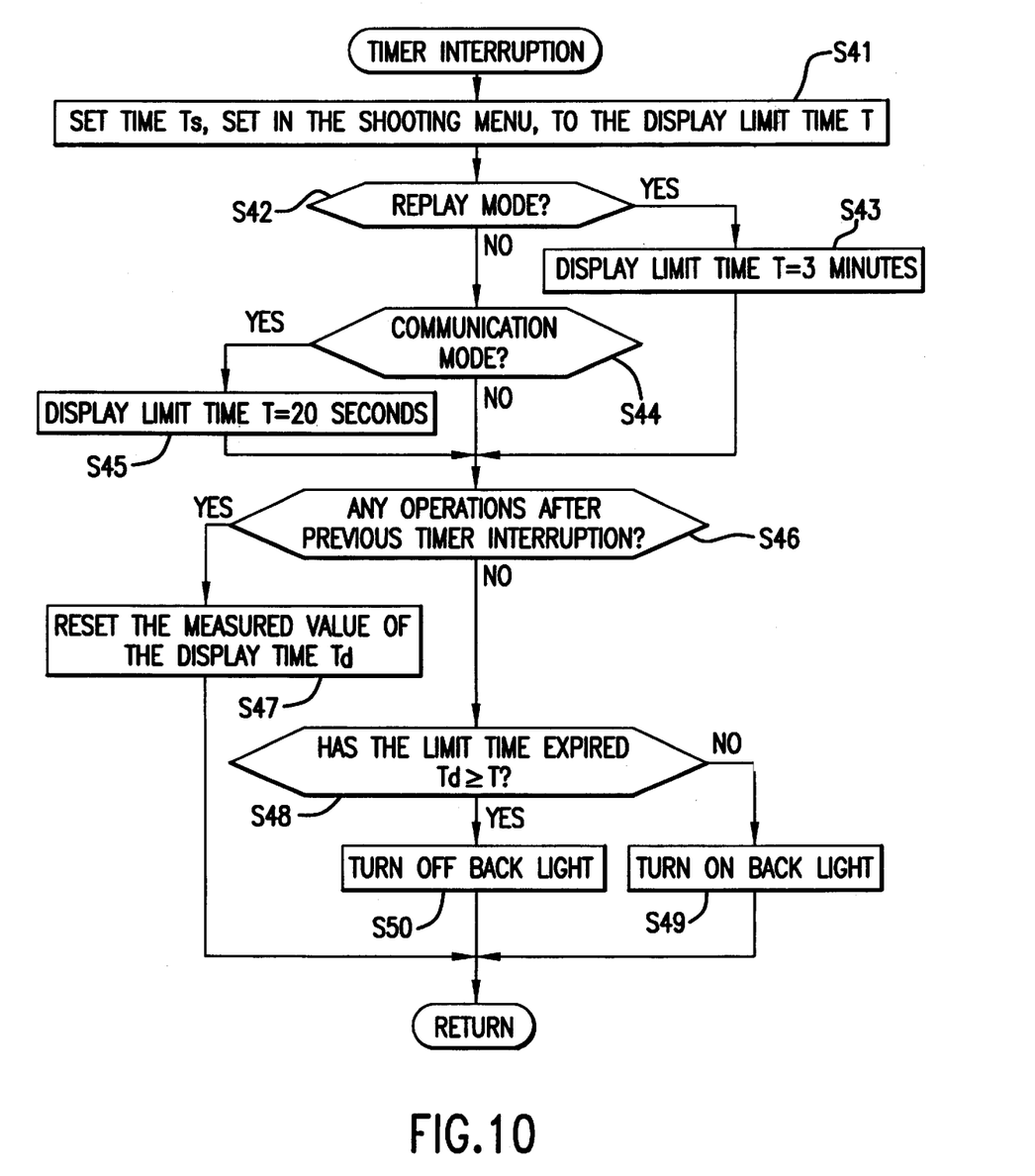
FIG. 10 is a flow chart explaining the timer interruption process relating to turning off the camera LCD back light.

Next, the process concerning turning off the back light is explained. FIG. 10 is a flow chart explaining the timer interruption process concerning turning off the back light. Furthermore, this interruption process is executed at intervals (e.g., every other second) by the microprocessor 34. First, the microprocessor 34 sets the time Ts, which was stored in the memory 48, as the display limit time T. The time Ts is a time value that is manually set at "timer set" during the menu process shown in FIG. 6 and is set at "one minute" in a default state (step S41). "One minute" here is equivalent to the display limit time assigned in advance to the shooting mode in a default state.

Next, the microprocessor 34 takes in the state of the selection dial 40 and determines whether the current operation mode is a replay mode (step S42). In the case of the replay mode, the microprocessor 34 changes the display limit time T to "three minutes" (step S43). "Three minutes" here is equivalent to the display limit time assigned in advance to the replay mode.

When the result of step S42 is NO, the microprocessor 34 takes in the state of the selection dial 40 and determines whether or not the operation mode at the present time is a communication mode (step S44). In the case of the communication mode, the microprocessor 34 changes the display limit time T to "20 seconds" (step S45). "20 seconds" here is equivalent to the display limit time assigned in advance to the communication mode.

After this process, the microprocessor 34 determines whether a process has been executed corresponding to an external operation (camera manipulation) such as a switch or the like since the previous timer interruption (step S46). If the switch or the like has been externally operated (YES of step S46), the measured value Td of the display time in the clock circuit 50 is reset, and the interruption process is completed (step S47).

Meanwhile, if the switch or the like has not been externally operated (NO of step S46), the microprocessor 34 determines whether the display time Td has exceeded the display limit time T (step S48). When the display time Td has not exceeded the display limit time T (NO of step S48), the interruption process is completed in a state where the back light of the image display 43 remains on (step S49). When the display time Td has exceeded the display limit time T (YES of step S48), the interruption process is completed by turning off the back light of the image display 43 (step S50).

By the execution of this timer interruption process, when the display time Td exceeds the display limit time T, which was assigned for each operation mode, respectively, the back light of the image display 43 is turned off.

By the operation described above, in the first embodiment, whenever the operator switches the operation mode by operating the selection dial 40, the value of the display limit time automatically changes. In particular, when the setting change is executed from the shooting mode to the replay mode, the setting of the display limit time is automatically extended. Therefore, it is possible to minimize problems such as the back light being turned off by itself during a special showing of the replay image or the like.

Furthermore, when the setting change is executed from the shooting mode to the communication mode, the setting of the display limit time is automatically shortened. Therefore, it is possible to minimize the power consumption of the back light during communication.

Figure 11:
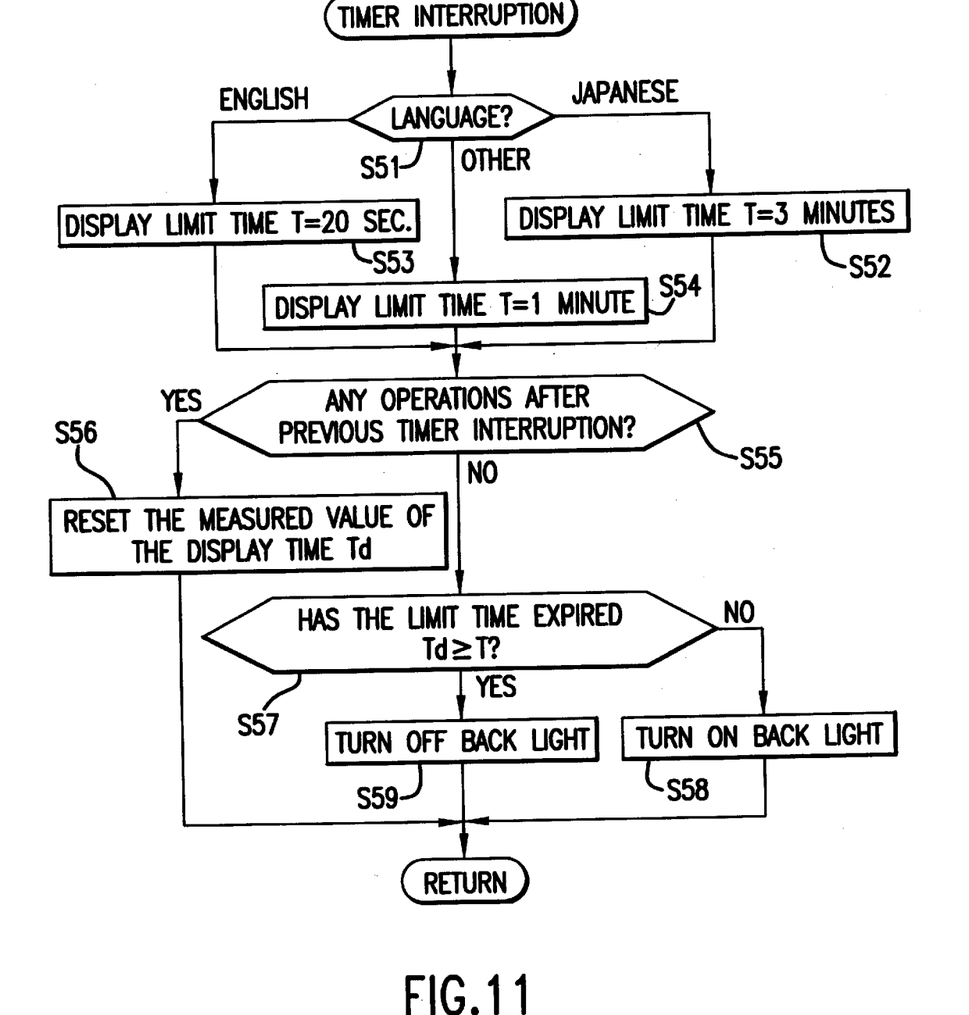
FIG. 11 is a flow chart showing the timer interruption process in the second embodiment.

FIG. 11 is a flow chart showing the timer interruption process in a second embodiment. The second embodiment implements the second aspect of the invention.

Furthermore, the configuration of the electronic camera in the second embodiment is the same as in the first embodiment (FIGS. 3 and 4), so a repeated explanation is omitted here. Furthermore, the operation of each operation mode in the second embodiment is the same as the operation in the first embodiment (FIGS. 5, 8 and 9), so a repeated explanation is omitted here.

The following explains the characteristics with respect to the operation of the second embodiment. First, when the timer interruption process shown in FIG. 11 begins, the microprocessor 34 takes in the usage language stored in the memory 48 (step S51). The usage language here is the usage language that is manually set in "LANGUAGE" during the menu process shown in FIG. 6, and it is set to "English" in the default state.

Next, the microprocessor 34 obtains the display limit time assigned to the current usage language and sets it to the display limit time T. That is, when the usage language is "Japanese," the display limit time T is set to "three minutes" (step S52). When the usage language is "English," the display limit time T is set to "20 seconds" (step S53). When the usage language is "other language," the display limit time T is set to "one minute" (step S54).

After this process, the microprocessor 34 determines whether a process has been executed relating to an external operation, such as a switch manipulation, since the previous timer interruption (step S55). If an external operation such as a switch manipulation has been executed (YES of step S55), the interruption process is completed by resetting the measured value Td of the display time in the clock circuit (step S56). When an external operation such as a switch has not been executed (NO of step S55), the microprocessor 34 determines whether the display time Td has exceeded the display limit time T (step S57). When the display time Td has not yet exceeded the display limit time T (NO of step S57), the interruption process is completed in a state where the back light of the image display 43 is turned on (step S58). When the display time Td exceeds the display limit time T (NO of step S57), the interruption process is completed by turning off the back light of the image display 43 (step S59).

By execution of this timer interruption process, when the display limit time T assigned for each usage language has been exceeded, the back light of the image display 43 is turned off.

By the operation described above, in the second embodiment, whenever the operator switches the usage language by operating the rotary dial 41, the value of the display limit time automatically changes.

Therefore, upon considering the geographical conditions of the operator to some degree from the usage language, it is possible to automatically set the display limit time. Furthermore, in the embodiment described above, specific values (20 s, 1 min., 3 min.) of the display limit time were provided. Needless to say, the present invention is not limited to the specific setting values.

Moreover, in the embodiment described above, the back light is turned off, but the invention is not limited to this. For example, it is also possible to decrease the illuminance of the back light.

In addition, with respect to a type of display that does not emit light from itself like the reflecting type liquid crystal panel, it is also possible to turn off the display pattern by decreasing the driving power of the display or decreasing the contrast of the display pattern.

Furthermore, in the embodiment described above, the display limit time T is determined based upon either the operation mode or the usage language, but the present invention is not limited to this. For example, it is also possible to finely adjust the display limit time T based on the combination of the operation mode and the usage language.

Additionally, as noted above, the geographical condition can be something other than a country or language. The geographical condition can relate to remoteness, population, and/or other factors that affect the availability and/or price of energy and/or batteries. Additionally, as noted above, the geographical condition can be sensed directly or simply user input based on user selection.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An electronic device, comprising:
   an electronic component that consumes electrical power when operating;
   a memory that stores a plurality of limit times, each of the limit times being stored in correspondence with a corresponding operation mode of the electronic device; and
   a controller that automatically reduces an amount of power consumed by the electronic component after the electronic device has remained in a non-operation state for a selected one of the limit times, the selected one of the limit times being selected based on the operation mode in which the electronic device is set.

2. The electronic device of claim 1, further comprising an operation mode selection switch that enables a user of the electronic device to select between a plurality of the operation modes, thereby selecting the selected one of the limit times.

3. The electronic device of claim 2, wherein the electronic device performs different functions in different ones of the operation modes.

4. The electronic device of claim 3, wherein the different functions include at least a data input function and a data replay function, the limit time corresponding to the data input function being shorter than the limit time corresponding to the data replay function.

5. The electronic device of claim 3, wherein the different functions include at least a data input function and a communication function, the limit time corresponding to the data input function being longer than the limit time corresponding to the communication function.

6. The electronic device of claim 2, wherein the different operation modes designate different geographical usage conditions.

7. The electronic device of claim 6, wherein the different geographical usage conditions are different countries.

8. The electronic device of claim 1, wherein the controller reduces the amount of power consumed by the electronic component by shutting-off power supplied to the electronic component.

9. The electronic device of claim 1, wherein the electronic component is a display.

10. The electronic device of claim 9, wherein the display is a LCD having a back light, and the controller reduces the amount of power consumed by the LCD by reducing the amount of power supplied to the back light.

11. The electronic device of claim 1, wherein the electronic device is an electronic camera.

12. The electronic device of claim 11, wherein the electronic camera is operable in different operation modes, each of which designates a different geographical usage condition.

13. The electronic device of claim 12, wherein the different geographical usage conditions are different countries.

14. The electronic device of claim 1, wherein:
   the electronic device is an electronic camera;
   the electronic component is a display mounted on the electronic camera; and
   the electronic camera performs different functions in different ones of the operation modes, the different functions including a photographing function and at least one other function.

15. The electronic device of claim 14, wherein the other function includes at least an image replay function, the limit time corresponding to the photographing function being shorter than the limit time corresponding to the image replay function.

16. The electronic device of claim 14, wherein the other function includes at least a communication function, the limit time corresponding to the photographing function being longer than the limit time corresponding to the communication function.

17. An electronic device, comprising:

an electronic component that consumes electrical power when operating;

storage means for storing a plurality of limit times, each of the limit times being stored in correspondence with a corresponding operation mode of the electronic device;

time setting means for selecting one of the plurality of limit times based on the operation mode in which the electronic device is operating;

non-operation state measuring means for measuring a duration of a time period during which the electronic device has remained in a non-operation state; and power saving means for reducing an amount of power consumed by the electronic component when the time period measured by the non-operation state measuring means exceeds the limit time selected by the time setting means.

18. The electronic device of claim 17, further comprising selection means for selecting between a plurality of the operation modes, wherein the time setting means selects the one of the limit times based on the operation mode selected by the selection means.

19. The electronic device of claim 18, wherein the electronic device performs different functions in different ones of the operation modes.

20. The electronic device of claim 18, wherein the different operation modes designate different geographical usage conditions.

21. The electronic device of claim 18, wherein the electronic component is a display.

22. The electronic device of claim 18, wherein the electronic device is an electronic camera, the electronic camera being operable in different operation modes, each of which designates a different geographical usage condition.

23. The electronic device of claim 18, wherein:

the electronic device is an electronic camera;

the electronic component is a display mounted on the electronic camera; and the electronic camera performs different functions in different ones of the operation modes, the different functions including a photographing function and at least one other function.

24. The electronic device of claim 23, wherein the other function includes at least an image replay function, the limit time corresponding to the photographing function being shorter than the limit time corresponding to the image replay function.

25. The electronic device of claim 23, wherein the other function includes at least a communication function, the limit time corresponding to the photographing function being longer than the limit time corresponding to the communication function.

26. A method of controlling an electronic device to conserve energy consumption, comprising the steps of:

storing a plurality of limit times, each of the limit times being stored in correspondence with a corresponding operation mode of the electronic device;

selecting one of the stored limit times based on the operation mode in which the electronic device is operating; and automatically reducing an amount of power consumed by an electronic component of the electronic device after the electronic device has remained in a non-operation state for the selected one of the limit times.

27. The method of claim 26, wherein the electronic device performs different functions in different ones of the operation modes, the different functions including at least a data input function and a data replay function, the limit time corresponding to the data input function being shorter than the limit time corresponding to the data replay function.

28. The method of claim 26, wherein the electronic device performs different functions in different ones of the operation modes, the different functions including at least a data input function and a communication function, the limit time corresponding to the data input function being longer than the limit time corresponding to the communication function.

29. The method of claim 26, wherein the different operation modes correspond to different geographical usage conditions.

30. The method of claim 26, wherein the step of automatically reducing the amount of power consumed by the electronic component includes shutting-off power supplied to the electronic component.

31. The method of claim 26, wherein the electronic component is a display.

32. The method of claim 26, wherein the electronic device is an electronic camera that is operable in different operation modes, each of which designates a different geographical usage condition.

33. The method of claim 26, wherein:

the electronic device is an electronic camera;

the electronic component is a display mounted on the electronic camera; and the electronic camera performs different functions in different ones of the operation modes, the different functions including a photographing function and at least one other function.

34. The method of claim 33, wherein the other function includes at least an image replay function, the limit time corresponding to the photographing function being shorter than the limit time corresponding to the image replay function.

35. The method of claim 33, wherein the other function includes at least a communication function, the limit time corresponding to the photographing function being longer than the limit time corresponding to the communication function.

* * * * *